(12) United States Patent
Stewart et al.

(10) Patent No.: US 6,373,828 B1
(45) Date of Patent: Apr. 16, 2002

(54) METHOD AND APPARATUS FOR COMPLETING A HANDOVER BETWEEN WIRELESS COMMUNICATION SYSTEMS

(75) Inventors: Randall R. Stewart, Crystal Lake; Edgar Martinez, Arlington Heights; Tom Joyner, Chicago; Rich Noradt, Lake Zurich, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/105,340

(22) Filed: Jun. 26, 1998

(51) Int. Cl.[7] .............................. H04Q 7/00; H04J 3/26; H04J 3/17

(52) U.S. Cl. ........................ 370/331; 370/467; 370/351

(58) Field of Search ...................... 455/73–91, 436–441, 455/550–575; 370/467, 351, 400, 238, 254, 331, 465, 432, 455, 433

(56) References Cited

U.S. PATENT DOCUMENTS 6,137,806 A * 10/2000 Martinez ..................... 370/391
6,215,790 B1 * 4/2001 Voit et al. .................... 370/401

* cited by examiner

Primary Examiner—Chau Nguyen
Assistant Examiner—Ron Abelson (57) ABSTRACT

A method and apparatus for a handover of a communication signal (370) associated with a mobile communication unit (116) between a Generic C-based wireless communication system (302) and a MSC-based wireless communication system (304), is disclosed. The handover method includes establishing a plurality of trunks (401) between a landline switch (316) and a MSC (317). The method also includes configuring a landline number routing table (403) and a landline trunk group table (404) in the landline switch (316), a mobile trunk group table (406) in the MSC (317), and establishing a message translation table (405) in the computing platform (312), such that one of the plurality of trunks and an associated signaling path to the computing platform (312) are always selected when the handover is required.

30 Claims, 8 Drawing Sheets

METHOD AND APPARATUS FOR COMPLETING A HANDOVER BETWEEN WIRELESS COMMUNICATION SYSTEMS

FIELD OF THE INVENTION

The present invention relates generally to communication systems and, more particularly, to a method and apparatus for completing a handover between wireless communication systems.

BACKGROUND OF THE INVENTION

Communication systems consisting of land mobile radio, cellular radiotelephone, personal communication system (PCS), and various other types are well known. A typical multiple access wireless communication system such as a digital radio frequency (RF) radiotelephone system includes a base station system, (BSS), having one or more base station transmitters and receivers (BTSs), and at least one base station controller (BSC). The BSS communicates via an RF channel with a mobile communication unit, commonly referred to as a mobile station (MS), operating within a coverage area served by a BTS. The BSCs are linked to mobile switching centers (MSC) which provide a connection between the multiple access wireless communication system and the public switched telephone network (PSTN) as well as interconnection of various cellular radiotelephone communication systems. The MSC provides the switching function as well as call routing, call billing, and subscriber features, among other things, whereas the BSC provides mobility management functions such as mobile station registration, location updating, and handover in the multiple access wireless communication system.

One such multiple access wireless communication system, which may be referred to as a MSC-based architecture system, is a direct sequence code division multiple access (DS-CDMA) cellular communication systems, such as set forth in the TIA Interim Standard (IS)-95A, Mobile Station-Base Station Compatibility Standards for Dual-Mode Wideband Spread Spectrum Cellular Systems, Telecommunications Industry Association, Washington, D. C. July 1993 [IS-95A]. According to these standards, coded communication signals are transmitted in common 1.25 megahertz (MHz) carriers between the BSS and mobile stations that are communicating in the service coverage areas of the BSS.

Multiple access wireless communication system functionality may be also accomplished through an alternate architecture. Such an architecture, commonly referred to as Generic C architecture, utilizes an landline switch, for example, a class 5 service switching point (SSP), to provide the switching function for the wireless communication system, thereby mitigating the need for an MSC. The SSP may also serve to provide the connection between the Generic C wireless communication system and the PSTN.

In a Generic C wireless communication system, at least one base station system (BSS) is linked to the SSP. In addition in one configuration of a Generic C architecture, the SSP is in communication with a service control point (SCP). The SCP is a database, remotely located from the SSP, which communicates with the SSP to provide customer-specific information. The SCP, when queried by the SSP, provides information to the SSP via a access manager/visitor location register (AMNLR). The AMNLR which provides wireless communication system access to a landline switch may be remotely located or collocated with the SCP.

In a wireless communication system, a communication link via an RF channel is established between a mobile station, or subscriber unit, and a source, or serving, BSC. As a mobile station moves out of range of the source BSC, the signal quality degrades until the communication link is ultimately be broken, or the call "dropped". To avoid loss of the communication link resulting from a dropped call, the communication link is shifted from the source BSC to a target BSC. This process of making the shift is commonly referred to in the wireless communication system area as a handover process.

Communication system service providers as well as communication system users desire handover capability between wireless communication systems configured with different architectures. For example, a mobile station, having received a landline originated call while initially traveling in a wireless communication system served by a Generic C architecture, may require a handover of its communication signal to a wireless communication system served by a MSC-based architecture.

Implementing mobile station handover capability between two Generic C-based architecture wireless communication systems has been specified in standards. Furthermore, implementing mobile station handover capability between MSC-based architecture wireless communication systems has been specified in standards. But, implementing mobile station handover capability between a wireless communication system served by a Generic C-based architecture and a wireless communication system served by a MSC-based architecture has not been specified or designed.

However, it has been suggested that handover capability between a Generic C architecture wireless communication system and an MSC-based architecture wireless communication system be enabled via a trunking scheme. The trunking scheme suggested requires additional trunk groups to be setup between all BSC's and all MSC's. For example, if three MSCs were possible handover candidates associated with ten BSCs, thirty additional trunking groups, or Ti spans, would be required to be allocated and controlled between the BSCs and the MSCs, thus incurring additional costs to wireless communication system operators. Obviously, a more cost efficient method of enabling a handover capability of a mobile communication signal between two architecturally different wireless communication systems is desired.

Therefore, a need exists for a method and apparatus for completing a handover of a mobile communication signal between architecturally different wireless communication systems which overcomes problems associated with the prior art.

DETAILED DESCRIPTION OF THE PREFERRED EMBODIMENT

Figure 4:
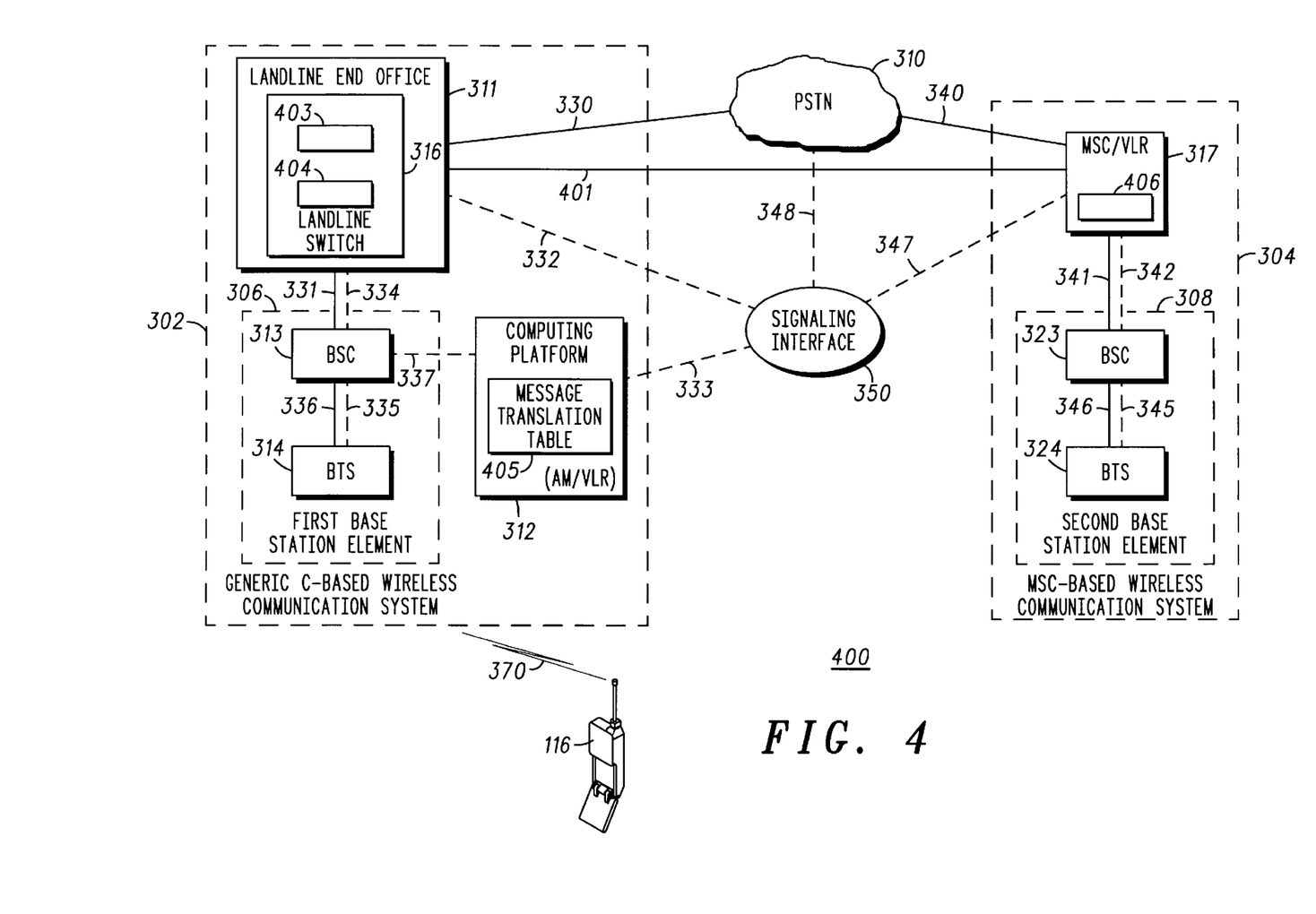
FIG. 4 depicts wireless communication systems as shown in FIG. 3, further illustrating aspects of a preferred, and an alternate embodiment of the present invention.

Generally speaking, a method and apparatus for a handover of a communication signal 370 associated with a mobile communication unit 116 between a Generic C-based wireless communication system 302 and a MSC-based wireless communication system 304, is disclosed. The handover method includes establishing a plurality of trunks 401 between a landline switch 316 in Generic C-based wireless communication system 302, and a MSC 317 in MSC-based wireless communication system 304. The method also includes configuring a landline number routing table 403 and a landline trunk group table 404 in landline switch 316, a mobile trunk group table 406 in MSC 317, and establishing a message translation table 405 in computing platform 312, such that one of the plurality of trunks and an associated signaling path to computing platform 312 is always selected when the handover is required.

A corresponding apparatus is also disclosed.

Figure 1:
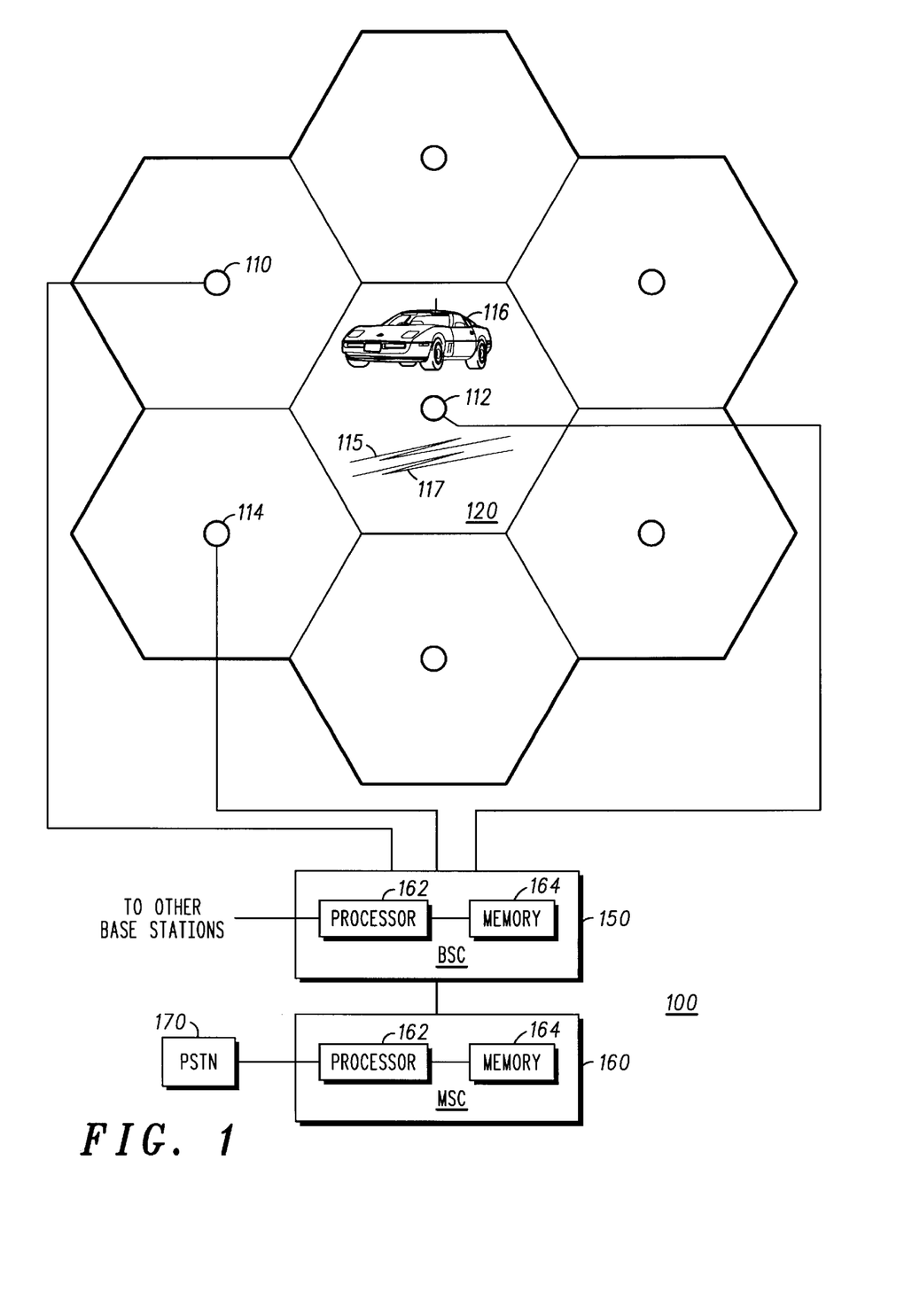
FIG. 1 depicts a typical MSC-based wireless communication system 100.

Turning now to the drawings, wherein like numerals designate like components, FIG. 1, a MSC-based wireless communication system 100, such as a direct sequence code division multiple access (DS-CDMA) digital radiotelephone system is shown. BTSs 110, 112, and 114 communicate with a mobile station such as mobile station 116, via radio frequency (RF) channels, for example uplink channel 115 and downlink channel 117, which provide physical paths over which communication signals such as voice, data, and video are transmitted, operating within a coverage area 120. BTS locations are chosen to provide overlapping coverage areas. BTS 110, 112, and 114, are coupled to a base station controller (BSC) 150, which includes, among other things, a processor 162 and a memory 164. BSC 150 and its associated BTSs, such as BTSs 110, 112, and 114, may be referred to as a base station system (BSS). BSC 150 is coupled to a mobile switching center MSC 160, also including, among other things, a processor 162 and a memory 164. MSC 160 provides translation and switching capability for MSC-based wireless communication system 100 and is coupled to a public switched telephone network (PSTN) 170. Calls originating with or terminating at mobile station 116 are processed through MSC 160 to either a wireline customer linked to PSTN 170 or other radiotelephone communication system users serviced by MSC 160 or other MSCs (not shown). MSC 160 communicates with other MSCs (not shown) across an IS-41 interface, according to well known methods. Moreover, BSC 150 and MSC 160 operate according to well known methods, and are commercially available from Motorola, Inc.

Figure 2:
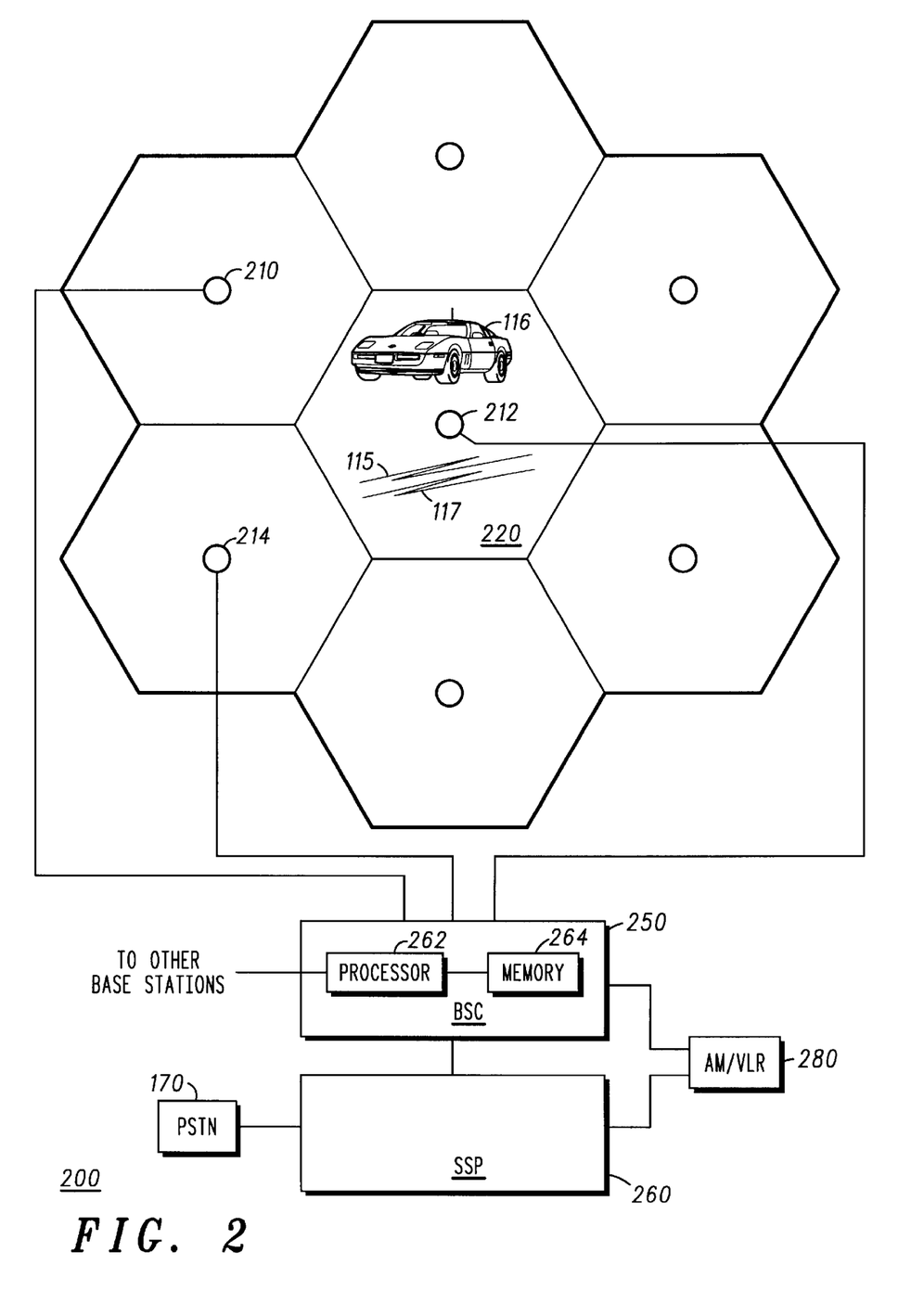
FIG. 2 depicts a typical Generic C-based wireless communication system 200.

FIG. 2 illustrates, a Generic C-based wireless communication system 200. BTSs 210, 212, and 214 communicate with a mobile station 116, via radio frequency (RF) channels which provide physical paths, for example uplink channel 115 and downlink channel 117, over which communication signals such as voice, data, and video are transmitted, operating within a coverage area 220. BTS 210, 212, and 214, are coupled to a BSC 250, which includes, among other things, a processor 262 and a memory 264. BSC 250 and its associated BTSs, such as BTSs 210, 212, and 214, may be referred to as a base station system (BSS). BSC 250 is coupled to a landline switch, for example, a class 5 service switching point (SSP) 260, to provide the switching function for Generic C-based wireless communication system 200. SSP 260 is coupled to a PSTN 170. BSC 250 is also coupled to an access manager/visitor location register (AMNLR) 280. In addition, AMNLR 280 is also coupled to SSP 260 to provide wireless communication system access, via signaling links, to SSP 260 and therefor augmenting the landline switch with wireless communication system capability. Calls originating with or terminating at mobile station 116 are processed through AMNLR 280 and SSP 260 to either a wireline customer linked to PSTN 170 or other Generic C-based wireless communication system users serviced by SSP 260. SSP 260 is well known in the art and communicates with other SSPs (not shown) across SS7 integrated services digital network—user part (ISUP) and analog trunk interfaces, according to well known methods.

Figure 3:
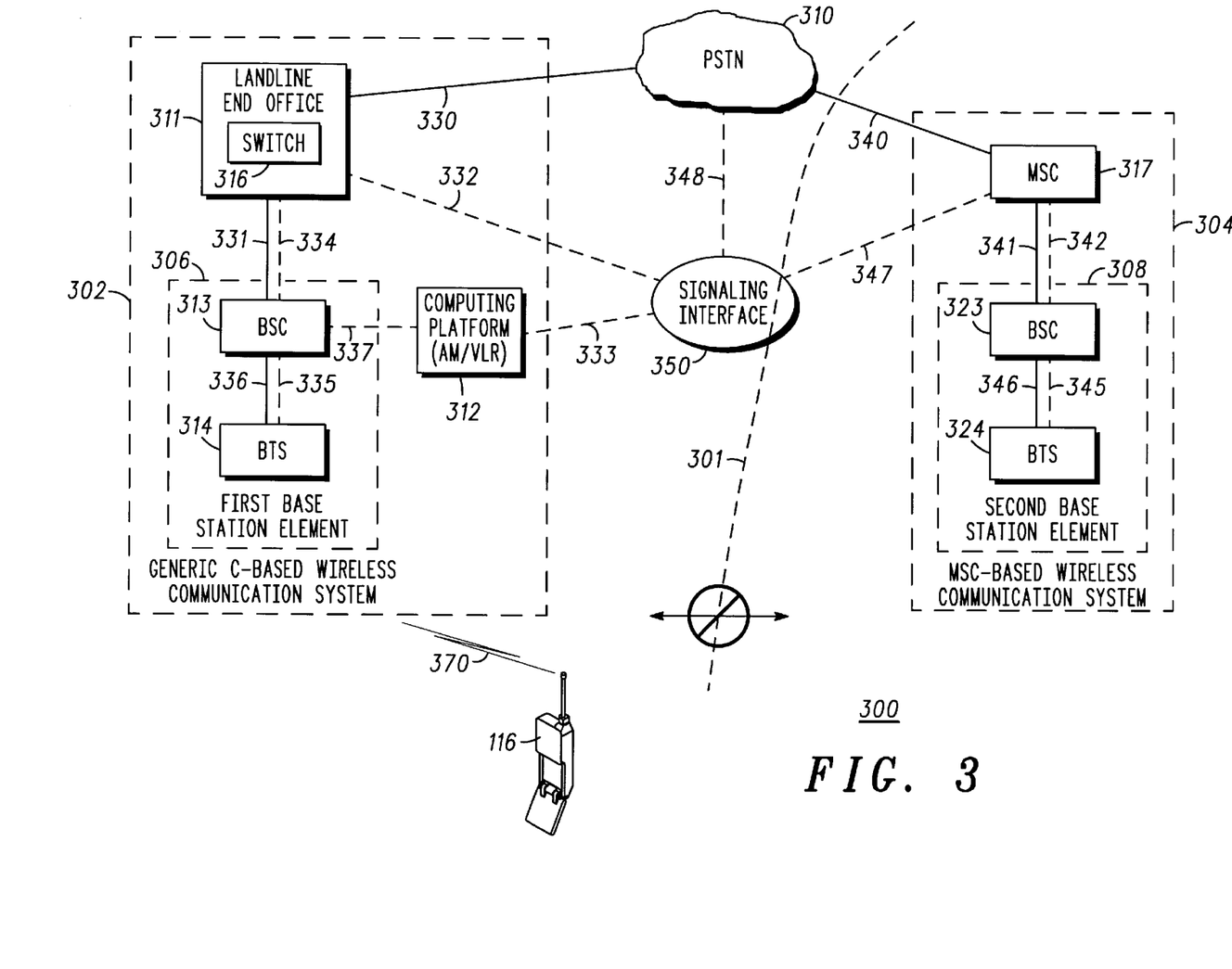
FIG. 3 is a partial block diagram 300 of a Generic C-based wireless communication system and MSC-based wireless communication system.

FIG. 3 is a partial block diagram 300 of a Generic C-based wireless communication system and MSC-based wireless communication system. Partial block diagram 300 depicts a handover border 301 between the first wireless communication system, a Generic C architecture wireless communication system, herein referred to as Generic C-based wireless communication system 302, and the second wireless communication system, herein referred to as an MSC-based wireless communication system 304.

Typical Generic C architectures such as Generic C-based wireless communication system 302 were developed to integrate wireless communication services using 800 MHz and 1800 MHz bandwidth capabilities from wireless base station systems, with landline communication elements. Accordingly, the first wireless communication system, Generic C-based wireless communication system 302, utilizes an existing landline end office 311, which includes a landline switch 316, for example, a class 5 switch. Landline switch 316 is coupled to a first base station element 306 and a computing platform 312 in order to provide Generic C-based wireless communication services. Landline switch 316 communicates with other landline end office switches (not shown) using protocols such as an ISUP protocol on SS7 (ISUP/SS7), and well known analog trunk protocols. Landline end office 311 provides the interface to a PSTN 310 via a link 330 which may also be enabled using protocols such as ISUP/SS7 and well known analog trunk protocols.

First base station element 306 includes a BSC 313 coupled to a BTS 314, although additional BSCs and BTSs may be included. BSC 313 is in communication with BTS 314 via a signaling link 335 and at least one trunking line 336 for carrying user data signals including voice, data, or video. Signaling link 335 may be implemented using one of a number of appropriate protocols such as a link access protocol-D (LAPD) protocol, an internet protocol (IP), or an asynchronous transfer mode (ATM) protocol. A suitable first base station element 306 may be purchased from Motorola, Inc.

Landline end office 311 communicates with first base station element 306 via a signaling link 334 and a plurality of trunk lines such as E1 or T1 spans also referred to as terrestrial circuits, although only one trunking line 331 is shown. In addition, first base station element 306 provides a signaling link 337 to computing platform 312. As shown in FIG. 3, signaling links 334 and 337 may be provided via out-of-band, bi-directional signaling which utilizes, for example an integrated services digital network (ISDN) protocol. But, if signaling link 334 is enabled as an in-band signaling link, there is a requirement for BSC 313 to forward signaling messages received via signaling link 334 to computing platform 312 for processing.

Landline end office 311 is in communication with computing platform 312 via a signaling interface 350 such as a signaling transfer point (STP) over a signaling link 332. Similarly, computing platform 312 is in communication with signaling interface 350 over a signaling link 333. In addition, signaling interface 350 is in communication with PSTN 310 over signaling link 348. Computing platform 312 communicates with landline end office 311 using a suitable signaling protocol such as Advanced Intelligent Network (AIN) 0.1, Bellcore, August 1992, (AIN 0.1) or ISUP/SS7 over out-of-band signaling links 332 and 333.

Computing platform 312 includes a service control point (SCP) capable of providing service specific information to landline switch 316, a mobility manager function, commonly referred to as an access manager (AM), capable of logically coupling first base station element 306 to landline end office 311, and a location register (VLR) capable of providing a local wireless subscriber database. Accordingly, computing platform 312 may be referred to as an AMNLR. Unlike a MSC-based wireless communication system architecture, switching functions associated with wireless communication calls in a Generic C-based wireless communication system are performed in landline switch 316 per routing instructions from computing platform 312. Computing platform 312 may also be in communication with a home location register (not shown) which provides a permanent subscriber database.

The second wireless communication system, MSC-based wireless communication system 304 includes a MSC 317 in communication with a second base station element 308. MSC 317 may also be in communication with, and responsive to PSTN 310 via a SS7/ISUP or analog trunks link 340. MSC 317 provides the switching and routing capabilities for second base station element 308.

MSC 317 communicates with second base station element 308 via a signaling link 342. Signaling link 342, responsible for conveying mobility management signaling from second base station element 308, may be implemented using a TIA Interim Standard 634 (IS-634) protocol as defined in TIA/EIA/IS-634, MSC-BS Interface for Public 800 MHz, Dec., 18, 1995. User data traffic such as audio, video, or data communication signals between MSC 317 and second base station element 308 is transported via a plurality of trunking lines, although a trunking line 341, is shown. In addition, MSC 317 is in communication with signaling interface 350 via a signaling link 347 capable of supporting out-of-band, bi-directional signaling.

Second base station element 308 includes a BSC 323 coupled to a BTS 324, although additional BSCs and BTSs may be included. BSC 323 is in communication with BTS 324 via a signaling link 345 and at least one trunking line 346. Signaling link 345 may be implemented using one of a number of suitable protocols.

A mobile station 116 traveling in the coverage area of first base station element 306 communicates, via well known radio frequency air interface specifications, such as IS-95 or IS-91, with either a wireline customer linked to PSTN 310 or to another wireless communication system user via a base station element such as first base station element 306. As mobile station 116 approaches the outer boundaries of the coverage area defined by handover border 301 and served by first base station element 306, a communication signal 370, or call, associated with mobile station 316 must be handed-over to another base station element in order to continue the call in progress. Lack of handover capability ultimately results in a communication signal 370 associated with mobile station 116 being terminated as mobile station 116 moves out of the coverage area served by first base station element 306.

A handover of communication signal 370 between two base station elements within a Generic C architecture wireless communication system has been specified in standards. Similarly, a handover of communication signal 370 between two base station elements within a MSC-based architecture wireless communication systems has been specified in standards. But, implementing a handover of communication signal 370 between two base station elements, one base station element in a wireless communication system served by a Generic C architecture and the other base station element served by a MSC-based architecture, has not been specified or designed.

Handover capability for completing a handover of a communication signal from a Generic C-based wireless communication system to a MSC-based wireless communication system, is illustrated in FIG. 4, according to a preferred embodiment of the present invention. Elements additional to those shown in FIG. 3 which are required to provide mobile communication signal handover capability are shown in FIG. 4.

The first element is the establishment of a plurality of trunks 401 between a landline switching element, for example landline switch 316, and a mobile switching element, for example MSC 317. Plurality of trunks 401, when selected, are capable of carrying user data traffic including voice, video and data. Plurality of trunks 401 are configured as ISUP trunk groups represented by a corresponding plurality of CIC numbers in landline switch 316. Plurality of trunks 401 are configured as IS-41 trunk groups represented by a corresponding plurality of trunk group and member numbers in MSC 317, the corresponding plurality of trunk group and member numbers corresponding to the corresponding plurality of CIC numbers in landline switch 316.

In addition, each element in Generic C-based wireless communication system 302 and MSC-based wireless communication system 403 is assigned a signaling address, or destination point code (DPC), which is used a an address for sending and receiving signaling messages. For example computing platform 312 may be assigned a first destination point code, while landline switch 316 may be assigned a second destination point code, and MSC 317 may be assigned a third destination point code. Thus, by providing a specific destination point code to a wireless communication system element, signaling messages configured in a ISUP/SS7 protocol or messages configured in a IS-41/SS7 protocol are routed to specified locations.

The second element is the configuration of a landline number routing table 403 in landline switch 316. Landline number routing table 403 is designed to automatically select plurality of trunks 401 upon receipt of a predefined number such as a guide directory number (GDN). Through the use of the GDN, landline routing table 403, when invoked by receipt of the GDN, guides selection of an appropriate trunk group. According to the preferred embodiment of the present invention, landline number routing table 403 automatically selects the plurality of trunks 401 upon receipt of the GDN.

The third element is the configuration of a landline trunk group table 404 in landline switch 316. Landline trunk group table 404 has as input an identity of plurality of trunks 401 and provides as output an identity of one of the plurality of trunks 401, and an associated signaling path to computing platform 312. Landline trunk group table 404 may be enabled as a look-up table which includes a trunk group type for plurality of trunks 401, for example an ISUP/SS7 compatible configuration, a number of trunks in plurality of trunks 401, a corresponding circuit identifier code (CIC) number for each of the trunks in plurality of trunks 401, and a trunk group termination point for plurality of trunks 401. In addition, landline trunk group table 404 provides the first destination point code to landline switch 316 for delivery of signaling messages, when one of the plurality of trunks 401 are input. Consequently, by "seeding" landline trunk group table 404 with the appropriate DPCs, selected signaling messages may be routed to alternate destinations. Thus, according to the preferred embodiment of the present invention, when invoked by selection of one of the plurality of trunks 401, landline trunk group table 404 automatically provides the DPC of computing platform 312 to landline switch 316 for purposes of signal message routing, instead of providing a DPC of a peer landline endoffice switch.

The fourth element is the establishment of a message translation table 405 in computing platform 312. Message translation table 405 provides a message translation capability which eneables translation of an ISUP signaling message originating in landline switch 316 into an analogous IS-41 signaling message suitable for receipt by MSC 317, and vice versa. Message translation table 405 includes the information, or table entries, necessary to accomplish mapping the message content of incoming ISUP signaling messages into the message content suitable for outgoing IS-41 signaling messages. The table entries include but are not limited to, local MSC identity numbers including a "MSC identity number" for the computing platform 312, corresponding CIC numbers, and their corresponding trunk group and member numbers. Accordingly, message translation table 405 in computing platform 312 can be used to "fool" landline switch 316 into forwarding signaling messages to computing platform 312 which then enables the handover of communication signal 370 from Generic C-based wireless communication system 302 to MSC-based wireless communication system 304.

Handover capability for completing a handover of a communication signal from a MSC-based wireless communication system to a Generic C-based wireless communication system, is also illustrated in FIG. 4, according to an alternate embodiment of the present invention. Elements additional to those shown in FIG. 3 which are required to provide mobile communication signal handover capability are shown in FIG. 4.

The first element is the establishment of a plurality of trunks 401 between a landline switching element, for example landline switch 316, and a mobile switching element, for example MSC 317. Plurality of trunks 401, when selected, are capable of carrying user data traffic including voice, video and data. Plurality of trunks 401 are configured as IS-41 trunk groups represented by a corresponding plurality of trunk group and member numbers in MSC 317. Plurality of trunks 401 are configured as ISUP trunk groups represented by a corresponding plurality of CIC numbers in landline switch 316, the corresponding plurality of CIC numbers corresponding to the corresponding plurality of trunk group and member numbers in MSC 317.

In addition, each element in Generic C-based wireless communication system 302 and MSC-based wireless communication system 403 is assigned a signaling address, or destination point code (DPC), which is used as an address for sending and receiving signaling messages. For example, computing platform 312 may be assigned a first destination point code, while landline switch 316 may be assigned a second destination point code, and MSC 317 may be assigned a third destination point code. Thus, by providing a specific destination point code to a wireless communication system element, signaling messages configured in a ISUP/SS7 protocol or messages configured in a IS-41/SS7 protocol are routed to specified locations.

The second element is the configuration of a mobile trunk group table 406 in MSC 317. Mobile trunk group table 406 has as input an identity of plurality of trunks 401 and provides as output an identity of one of plurality of trunks 401 and an associated signaling path to computing platform 312. Mobile trunk group table 406 may be enabled as a look-up table which includes a trunk group type for plurality of trunks 401, for example an IS-41/SS7 compatible configuration, a number of trunks in plurality of trunks 401, a corresponding trunk group and member number for each of the trunks in plurality of trunks 401, and a trunk group termination point for plurality of trunks 401. In addition, mobile trunk group table 406 provides the first destination point code to MSC 317 for delivery of signaling messages when one of the plurality of trunks 401 are input. Consequently, by "seeding" mobile trunk group table 406 with the appropriate DPCs, selected signaling messages may be routed to alternate destinations. Thus, according to the alternate embodiment of the present invention, when invoked by selection of one of the plurality of trunks 401, mobile trunk group table 406 automatically provides the DPC of computing platform 312 to MSC 317 for purposes of signaling message routing from MSC 317, instead of providing a DPC of a peer MSC.

The third element is the establishment of a message translation table 405 in computing platform 312. Message translation table 405 provides message translation capability to translate an IS-41 signaling message originating at MSC 317 into an analogous IS-41 signaling message suitable for receipt by landline switch 316, and vice versa. Message translation table 405 includes the information, or table entries, necessary to accomplish a translation of message content of incoming IS-41 signaling messages into message content suitable for outgoing IS-41 signaling messages. The table entries in message translation table 405 include but are not limited to, local MSC identity numbers including a "MSC identity number" for the computing platform 312, corresponding CIC numbers, and corresponding trunk group and member numbers. Accordingly, message translation table 405 in computing platform 312 can be used to "fool" MSC 317 into forwarding signaling messages to computing platform 312 which then enables a handover of communication signal 370 from MSC-based wireless communication system 304 to Generic C-based wireless communication system 302.

Figure 5:
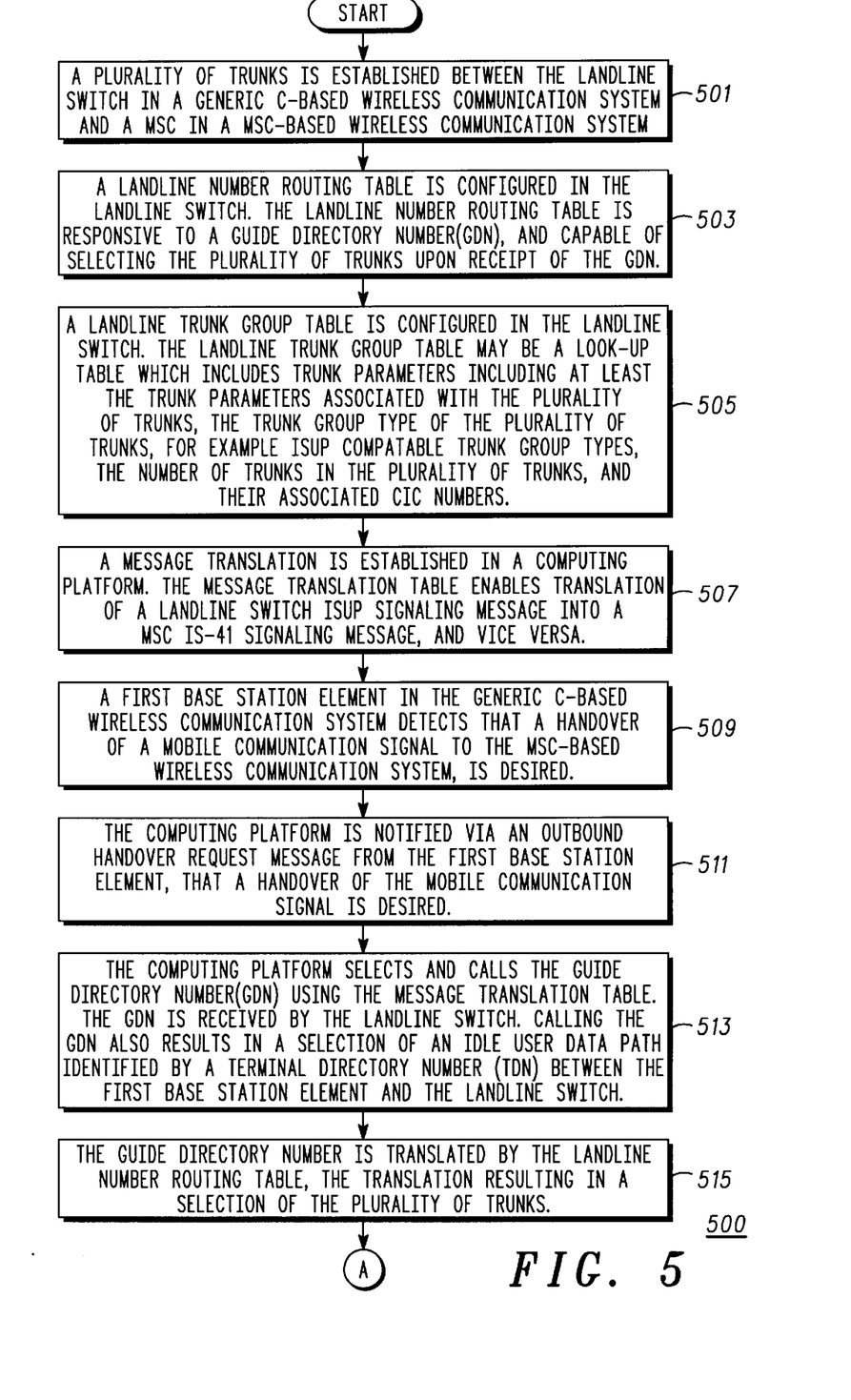
FIG. 5 and FIG. 6 show a flow chart of a method for completing a handover of a communication signal from a Generic C-based wireless communication system to a MSC-based wireless communication system, according to the preferred embodiment of the present invention.

In FIG. 5 a flow chart representing a method, generally designated 500 of completing a handover of a communication signal from Generic C-based wireless communication system 302 to MSC-based wireless communication system 304 depicted in FIG. 4, is illustrated, according to the preferred embodiment of the present invention.

First, a plurality of trunks 401 is established between the landline switch 316 and MSC 317 at step 501. Plurality of trunks 401, when selected, carries user data traffic which may include voice, video, and data. Plurality of trunks 401 are configured as ISUP trunk groups represented by CIC numbers at the "landline switch end," whereas they are configured as IS-41 trunk groups represented by trunk group and member numbers at the "MSC end." In addition, a first destination point code representative of the computing platform 312, a second destination point code representative of landline switch 316, and a third destination point code representative of MSC 317, is established, resulting in the formation of signaling routes used for transporting signaling messages. Thus, an IS-41 signaling message capability between computing platform 312 and MSC 317 may be established.

Next, at step 503, a landline number routing table 403 is configured in landline switch 316. Landline number routing table 403 is responsive to a guide directory number (GDN), and capable of selecting plurality of trunks 401 between the landline switch 316 and MSC 317, upon receipt of the GDN.

A landline trunk group table 404 is also configured in landline switch 316, at step 505. Landline trunk group table 404 may be enabled as a look-up table which includes trunk parameters including at least the trunk parameters associated with plurality of trunks 401 between landline switch 316 and MSC 317. The trunk parameters also include the trunk group type of plurality of trunks 401, for example ISUP compatible trunk group types, the number of trunks in plurality of trunks 401, their associated CIC numbers, and their associated frame termination point. According to the preferred embodiment of the present invention, the trunk group type "seen" by the landline switch, is ISUP compatible. In addition, whenever one of the plurality of trunks 401 is selected as a user data path, landline trunk group table 404 provides the first destination point code as the destination for all signaling messages sent from landline switch 316. Thus, when landline number routing table 403 directs selection of plurality of trunks 401, landline trunk group table 404 provides the information to landline switch 316 needed to establish a circuit, the circuit including one of the plurality of trunks 401 for carrying user data traffic, and a signaling path between landline switch 316 and the computing platform 312 for carrying signaling messages.

Next, at step 507, a message translation table 405 is established in computing platform 312. Message translation table 405 enables translation of a landline switch ISUP signaling message into a MSC IS-41 signaling message, and vice versa. Message translation table 405 includes the table entries necessary to accomplish a translation of message content of incoming ISUP signaling messages into message content suitable for outgoing IS-41 signaling messages. The table entries include but are not limited to local MSC identity numbers including a "MSC identity number" for computing platform 312, corresponding CIC numbers, and their corresponding trunk group and member numbers.

Next at step 509, first base station element 306 in Generic C-based wireless communication system 302 detects that a handover of a communication signal 370 to a second base station element 308 in MSC-based wireless communication system 304, is desired. Communication signal 370 may be between mobile station 116, and either another mobile station user via landline end office 311 and/or a PSTN 310, or a landline user via a terrestrial circuit established between first base station element 306 to PSTN 310 through landline end office 311.

Next, computing platform 312 is notified via an outbound handover request message from first base station element 306, that a handover of communication signal 370 is desired, at step 511. The handover request message may use an IS-634 protocol and includes at least an identity of second base station element 308 as the target base satuion element.

Next, at step 513, computing platform 312 selects and calls, via signaling link 337, the guide directory number (GDN) as a result of a translation in message translation table 405. The selection of the GDN by computing platform 312 is based on the identity of second base station element 308. Calling the GDN by computing platform also results in the selection of an idle user data path between first base station element 306 and landline switch 316. The idle user data path may be referred to as a terrestrial circuit, and is identified by a terminal directory number (TDN). The guide directory number is received by landline switch 316.

The guide directory number is then translated at step 515 by landline number routing table 403, the translation resulting in a selection of plurality of trunks 401 originating at landline switch 316 and terminating at MSC 317.

Next, at step 517, landline switch 316 uses landline trunk group table 404 to select one of the trunks from plurality of trunks 401 to carry user data traffic, and to select a signaling path to the first destination point code to carry signaling messages. Thus, after landline number routing table 403 selects plurality of trunks 401, landline trunk group table 404 provides the information to landline switch 316 in order to establish a circuit, the circuit including the one of the trunks from plurality of trunks 401, and the signaling path to computing platform 312. From the perspective of landline switch 316, the one of the trunks from plurality of trunks 401 is identified by a CIC number. Landline switch 316 then generates an ISUP initial address message (IAM) which includes the TDN, the GDN, and the CIC number, which is automatically routed to the first destination point code.

Figure 6:
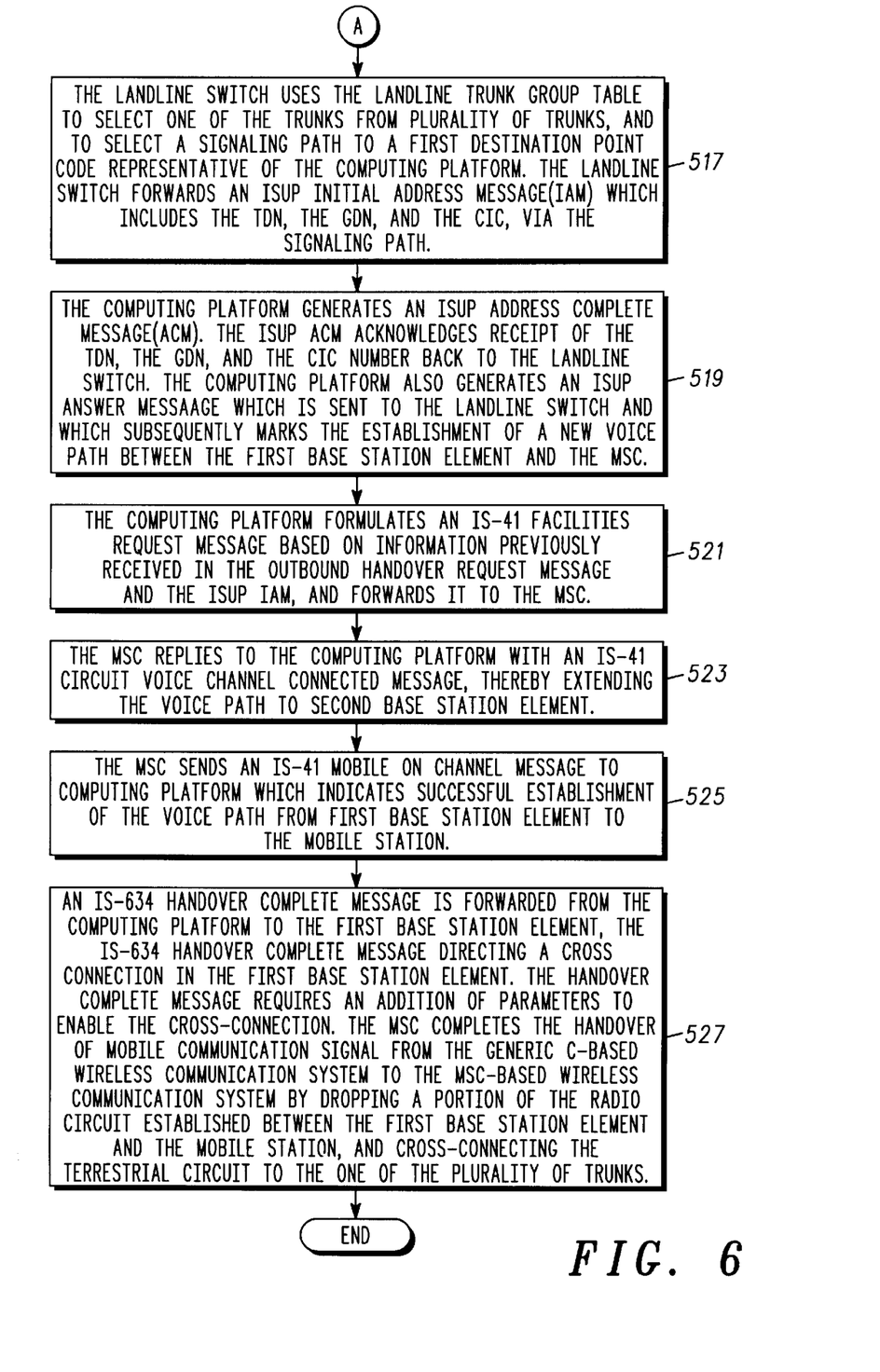

As a result of receiving the ISUP IAM from landline switch 316, computing platform 312 generates an ISUP address complete message (ACM), at step 519. The ISUP ACM acknowledges receipt of the TDN, the GDN, and the CIC number, to landline switch 316. Computing platform 312 also generates an ISUP answer message which is sent to landline switch 316, and which subsequently marks the establishment of a new voice path between first base station element 306 and MSC 317.

Computing platform 312 formulates an IS-41 facilities request message based on information previously received in the handover request message and the ISUP IAM, at step 521. The IS-41 facilities request message includes the trunk group and member number of the one of the trunks from plurality of trunks 401, and the trunk group and member number translated by message translation table 405, using the corresponding CIC number. The IS-41 facilities message also includes an identity of mobile station 116, an identity of first base station element 306, and an identity of second base station element 308, among other things. The IS-41 facilities request message is forwarded from computing platform 312 to MSC 317 via the IS-41 signaling capability.

In response to the IS-41 facilities request message, MSC 317 replies to computing platform 312 with an IS-41 circuit voice channel connected message at step 523, thereby extending the new voice path between first base station element 306 and MSC 317 to second base station element 308.

Next at step 525, upon receipt of communication signal 370 by second base station element 308, MSC 317 sends an IS-41 mobile on channel message to computing platform 312,. The IS-41 mobile new voice path between first base station element 306 and second base station element 308 to mobile station 116.

Finally, at step 527, an IS-634 handover complete message is forwarded from computing platform 312 to first base station element 306, the IS-634 handover complete message directing a cross-connection in first base station element 306, the cross-connection connecting thenew voice path with the original terrestrial circuit through landline switch 316 to PSTN 310. According to the preferred embodiment of the present invention, the IS-634 handover complete message requires an addition of parameters to enable the cross-connection. As a result, a handover of the mobile communication signal from Generic C-based wireless communication system 302 to MSC-based wireless communication system 304, is accomplished.

Figure 7:
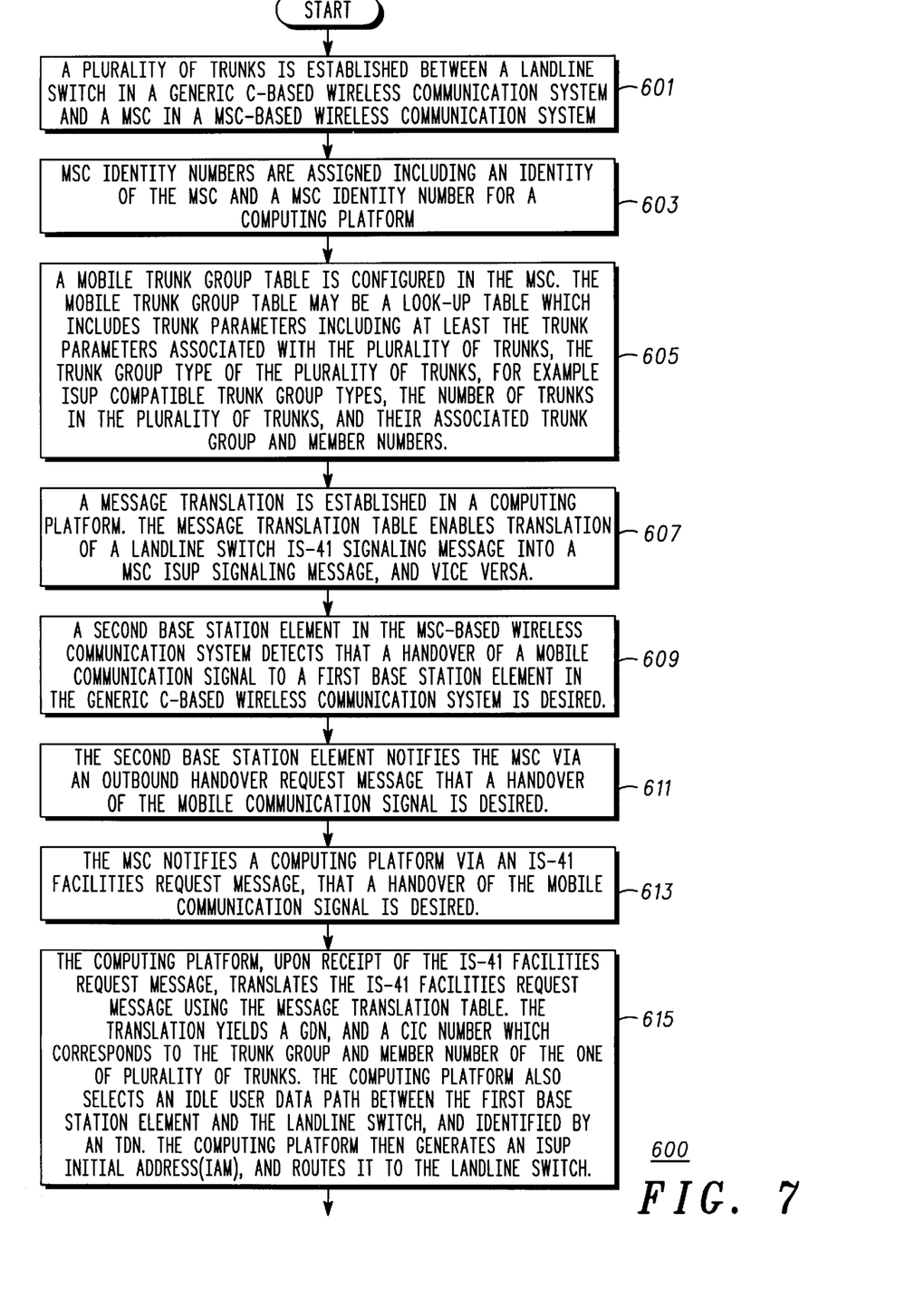
FIG. 7 and FIG. 8 show a flow chart of a method for completing a handover of a communication signal from a MSC-based wireless communication systems to a Generic C-based wireless communication system, according to the alternate embodiment of the present invention.

In FIG. 6 a flow chart representing a method, generally designated 600 of completing a handover of a communication signal from MSC-based wireless communication system 304 to Generic C-based wireless communication system 302 depicted in FIG. 4, is illustrated, according to the alternate embodiment of the present invention.

First, a plurality of trunks 401 is established between the landline switch 316 and MSC 317, at step 601. Plurality of trunks 401, when selected, carry user data traffic which may include voice, video, and data. Plurality of trunks 401 are configured as ISUP trunk groups represented by CIC numbers at the "landline switch end," whereas they are configured as IS-41 trunk groups represented by trunk group and member numbers at the "MSC end." In addition, a first destination point code representative of computing platform 312, a second destination point code representative of landline switch 316, and a third destination point code representative of MSC 317, is established, resulting in the formation of signaling routes used for transporting signaling messages. Thus, an ISUP signaling message capability between computing platform 312 and landline switch 316 may be established.

Next, at step 603, each MSC is assigned an MSC identity number, the MSC identity numbers including an identity of MSC 317 and a "MSC identity number" for computing platform 312.

A mobile trunk group table 406 is configured in MSC 317, at step 605. Mobile trunk group table 406 includes a plurality of trunk parameters including at least the trunk parameters associated with plurality of trunks 401 between landline switch 316 and MSC 317. The trunk parameters also include, at a minimum, the trunk group type of plurality of trunks 401, the number of trunks in plurality of trunks 401, their associated trunk group and member numbers, and their associated frame termination point. According to the alternate embodiment of the present invention, the trunk group type "seen" by MSC 317, is IS-41 compatible. In addition, whenever one of plurality of trunks 401 is selected as a user data path, mobile trunk group table 406 provides the first destination point code as the destination for all signaling messages sent from MSC 317. Thus, when the triggered by a handoff request message which includes an identity of an element associated with a target cell and sector, a look-up table (not shown), identifies the target MSC associated with the target cell and sector. Accordingly, landline switch 316 is selected as a "target MSC" when a handover of communication signal 370 is required from MSC-based wireless communication system 304 to Generic C-based wireless communication system 302. Further, the MSC identity number associated with landline switch 316 is used by MSC 317 to invoke selection of plurality of trunks 401. As a result of the selection of plurality of trunks 401, mobile trunk group table 406 provides the necessary information to MSC 317 to establish a circuit, the circuit including one of plurality of trunks 401 to carry user data traffic, and a signaling path between MSC 317 and computing platform 312 to carry signaling messages.

Next, at step 607, a message translation table 405 is established in computing platform 312. Message translation table 405 is capable of translating IS-41 signaling message from MSC 317 into an ISUP signaling message suitable for landline switch 316, and vice versa. Message translation table 405 includes the table entries necessary to accomplish a translation of message content of incoming IS-41 signaling messages, into message content suitable for outgoing ISUP signaling messages. The table entries include, but are not limited to, local MSC identity numbers including a "MSC identity number" for computing platform 312, corresponding CIC numbers, and their corresponding trunk group and member numbers.

Next at step 609, second base station element 308 in MSC-based wireless communication system 304, detects that a handover of a communication signal 370 to a first base station element 308 in Generic C-based wireless communication system 302, is desired. Communication signal 370 may be established between mobile station 116, and either another mobile station user via MSC 317 and/or a PSTN 310, or a landline user via a terrestrial circuit established between second base station element 308 to PSTN 310 through MSC 317.

Second base station element 308 notifies MSC 317 via a outbound handover request message using, for example an IS-634 protocol, that a handover of mobile communication signal 370 is desired, at step 611. The outbound handover request message includes an identity of the target cell and sector depicted as first base station element 306 in FIG. 4. Upon receipt of the outbound handover request message, MSC 317 selects plurality of trunks 401, via a translation of an identity of the "target MSC", or landline switch 316. Next, using an identity of plurality of trunks 401 as input, mobile trunk group table 406 provides the necessary information to MSC 317 to select one of plurality of trunks 401, and to select, via the use of the first destination point code, a signaling path to the computing platform 312.

Next at step 613, MSC 317 notifies computing platform 312 via an IS-41 facilities request message sent over the signaling path, that a handover of mobile communication signal 370 is desired. The IS-41 facilities request message includes an identity of mobile station 116, an identity of first base station element 306, and the identity of the one of plurality of trunks 401 selected to carry user data traffic.

At step 615, computing platform 312 upon receipt of the IS-41 facilities request message, translates the IS-41 facilities request message using message translation table 405. The translation yields a GDN, and a CIC number which corresponds to the trunk group and member number of the one of plurality of trunks 401. Computing platform 312 also selects an idle user data path between first base station element 306 and landline switch 316, identified by a TDN. Computing platform 312 then generates an ISUP initial address message (IAM) which includes the CIC number representative of an identity of the one of the plurality of trunks 401, the GDN representative of the calling number, and the TDN representative of the called number, and routes the ISUP IAM to landline switch 316 via signaling links 333 and 332.

Figure 8:
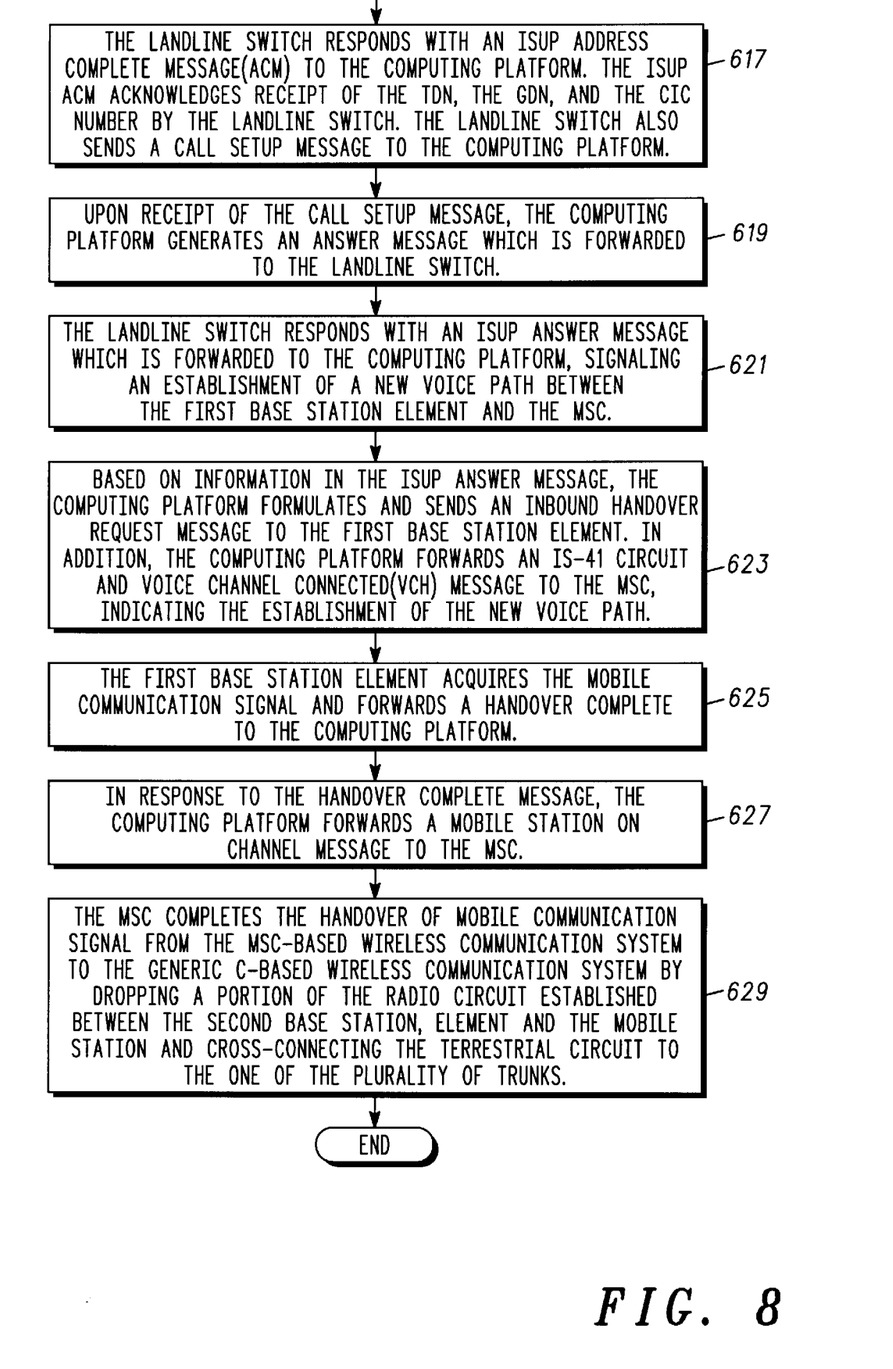

Landline switch 316 responds with an ISUP address complete message (ACM) to computing platform 312 upon receipt of the ISUP IAM, at step 617. The ISUP ACM acknowledges receipt of the TDN, the GDN, and the CIC number by landline switch 316. Landline switch 316 also sends a call setup message, using for example an ISDN protocol, to computing platform 312 via signaling links 334 and 337.

Upon receipt of the call setup message, computing platform 312 generates an answer message using, for example an ISDN protocol which is sent to landline switch 316, at step 619.

Upon receipt of the answer message, landline switch 316 responds with an ISUP answer message to computing platform 312 via signaling links 332 and 333, at step 621. Receipt of the ISUP answer message by computing platform 312 marks an establishment of a new voice path between first base station element 306 and MSC 317.

Based on information in the ISUP answer message, at step 623, computing platform 312 formulates and sends an inbound handover request message, using for example an IS-634 protocol, to first base station element 306 via signaling link 337. The inbound handover request message includes the identity of mobile station 116, the identity of first base station element 306, the identity of second base station element 308, and an identity of a terrestrial circuit identified by its TDN, among other things. In addition, computing platform 312 forwards an IS-41 circuit and voice channel connected (VCH) message to MSC 317, indicating establishment of the new voice path between first base station element 306 and MSC 317.

Upon receipt of the inbound handover request message, first base station element 306 acquires communication signal 370 at step 625. As a result of the acquisition, first base station element 306 forwards a handover complete message, using for example an IS-634 protocol, to computing platform 312 via signaling link 337.

In response to the handover complete message, computing platform 312 forwards a mobile station on channel message to MSC 317 via the selected signaling path denoted by signaling links 333 and 347, at step 627.

Next at step 629, MSC 317 completes the handover of mobile communication signal 370 from MSC-based wireless communication system 304 to Generic C-based wireless communication system 302, by dropping a portion of the radio circuit established between second base station element 308 and mobile station 116, and cross-connecting the terrestrial circuit to the wireline customer or the another radiotelephone communication system customer, to the one of the plurality of trunk 401 used to carry user data traffic between MSC 317 and landline switch 316.

It will be apparent that other forms of the invention, and embodiments other than the specific embodiments described above, may be devised without departing from the spirit and scope of the appended claims and their equivalents.

We claim:

1. A method for completing a handover of a communication signal associated with a mobile communication unit from a first wireless communication system to a second wireless communication system, the first wireless communication system comprising a landline switching element, a computing platform and a first base station element, and the second wireless communication system comprising a mobile switching element and a second base station element, the method comprising:

establishing a plurality of trunks between the landline switching element and the mobile switching element, the plurality of trunks, when selected, capable of carrying user data traffic;

configuring a landline number routing table in the landline switching element, the landline number routing table automatically selecting the plurality of trunks upon receipt of a guide directory number (GDN);

configuring a landline trunk group table in the landline switching element, the landline trunk group table having as input an identity of the plurality of trunks and providing as output an identity of one of the plurality of trunks and an associated signaling path to the computing platform; and establishing a message translation table in the computing platform, the message translation table capable of translating a ISUP signaling message from the landline switching element into an IS-41 signaling message suitable for receipt by the mobile switching element.

2. The method according to claim 1, wherein the step of establishing the plurality of trunks between the landline switching element and the mobile switching element further comprises the steps of:

configuring the plurality of trunks as ISUP trunk groups represented by a corresponding plurality of CIC numbers in the landline switching element; and configuring the plurality of trunks as IS-41 trunk groups represented by a corresponding plurality of trunk group and member numbers in the mobile switching element, the corresponding plurality of trunk group and member numbers corresponding to the corresponding plurality of CIC numbers in the landline switching element.

3. The method according to claim 1, further comprising the step the steps of:

assigning a first signaling address to the computing platform;

assigning a second signaling address to the landline switching element; and assigning a third signaling address to the mobile switching element.

4. The method according to claim 3, wherein a signaling address comprises a destination point code.

5. The method according to claim 3, wherein the step of configuring a landline trunk group table further comprises the step of:

providing a trunk group type for the plurality of trunks, a number of trunks in the plurality of trunks, a corresponding CIC number for each trunk in the plurality of trunks, a trunk group termination point for the plurality of trunks, and the first signaling address representing the computing platform for the associated signaling path.

6. The method according to claim 1, further comprising the steps of:

detecting, by the first base station element, that a handover of the communication signal is desired;

notifying the computing platform via an outbound handover request message that a handover of the communication signal to the second wireless communication system is desired, the outbound handover request message including an identity of the second base station system;

calling the GDN by the computing platform in response to receipt of the handover request message; and selecting an idle user data path between the first base station element and the landline switching element, the idle user data path between the first base station element and the landline switching element identified by a terminal directory number (TDN).

7. The method according to claim 6, further comprising the steps of:

selecting, via the landline routing table, the plurality of trunks between the landline switch and the MSC upon receipt of the directory number by the landline switching element;

selecting one of the plurality of trunks for carrying user data traffic, the one of the plurality of trunks, the one of the plurality of trunks identified by a CIC number; and selecting a signaling path between the landline switching element and the computing platform for carrying signaling messages based on the landline trunk group table, the selection of the signaling path based upon the first address as a table entry in the landline trunk group table associated with the one of the plurality of trunks.

8. The method according to claim 7, further comprising the steps of:

generating an integrated services digital network—user part (ISUP) initial address message (IAM), the ISUP IAM comprising the TDN, the GDN, and the CIC number;

forwarding the ISUP IAM from the landline switching element to the computing platform as a result of the selection of the signaling path;

acknowledging receipt of the ISUP IAM by the computing platform with an ISUP address complete message (ACM) sent from the computing platform to the landline switching element; and generating an ISUP answer message by the computing platform sent from the computing platform to the landline switch, the ISUP answer message indicating an establishment of a new voice path between the first base station element and the mobile switching element.

9. The method according to claim 7, further comprising the steps of:

generating an IS-41 facilities request message by the AM/VLR, the IS-41 facilities request message based on information previously received in the handover request message and the ISUP IAM, the IS-41 facilities request message including the mobile station identity, an identity of the first base station element, an identity of the second base station element, and an identity of the trunk group and member number of the one of the number of trunks selected from the trunk group, the trunk group and member number translated by the message translation table using the corresponding CIC number;

forwarding the IS-41 facilities request message to the mobile switching element; and forwarding an IS-41 circuit voice channel connected message from the mobile switching element to the computing platform in response to receipt of the IS-41 facilities request message by the mobile switching element, IS-41 circuit voice channel connected message indicating an extension of the new voice path between the first base station element and the mobile switching element, to the second base station element.

10. The method according to claim 9, further comprising the step of performing a handover of the communication signal from a first base station element to a second base station element.

11. The method according to claim 10, further comprising the steps of:

forwarding an IS-41 mobile on channel message from the mobile switching platform to the computing platform, the IS-41 mobile on channel message indicating an extension of the new voice path between the first base station element and the mobile switching element and the second base station element, to the mobile communication unit; and forwarding an IS-634 handover complete message from the computing platform to the first base station element, the IS-634 handover complete message directing a cross-connection in the first base station system of the new voice path, and resulting in a dropping of the communication signal between the first base station element and the mobile station.

12. The method according to claim 1, wherein the first wireless communication system comprises a Generic C architecture based wireless communication system.

13. The method according to claim 1, wherein the landline switching element comprises a class 5 switch.

14. The method according to claim 1, wherein the second wireless communication system comprises one of a code division multiple access (CDMA) system, a time division multiple access (TDMA) system and an analog communication system.

15. A method for completing a handover of a communication signal associated with a mobile communication unit from a second wireless communication system to a first wireless communication system, the first wireless communication system comprising a landline switching element, a computing platform and a first base station element, and the second wireless communication system comprising a mobile switching element and a second base station element, the method comprising:

establishing a plurality of trunks between the landline switching element and the mobile switching element, the plurality of trunks, when selected, capable of carrying user data traffic;

configuring a mobile trunk group table in the mobile switching element, the mobile trunk group table having as input an identity of the plurality of trunks and providing as output an identity of one of the plurality of trunks and an associated signaling path to the computing platform; and establishing a message translation table in the computing platform, the message translation table capable of translating an IS-41 signaling message from the mobile switching element into an integrated services digital network—user part (ISUP) signaling message suitable for receipt by the landline switching element.

16. The method according to claim 15, wherein the step of establishing the plurality of trunks between the landline switching element and the mobile switching element further comprises the steps of:

configuring the plurality of trunks as IS-41 trunk groups represented by a corresponding plurality of trunk group and member numbers in the mobile switching element; and configuring the plurality of trunks as ISUP trunk groups represented by a corresponding plurality of CIC numbers in the landline switching element, the corresponding plurality of CIC numbers corresponding to the corresponding plurality of trunk group and member numbers in the mobile switching element.

17. The method according to claim 15, further comprising the step the steps of:

assigning a first signaling address to the computing platform;

assigning a second signaling address to the landline switching element; and assigning a third signaling address to the mobile switching element.

18. The method according to claim 17, wherein a signaling address comprises a destination point code.

19. The method according to claim 17, wherein the step of configuring a mobile trunk group table further comprises the step of:

providing a trunk group type for the plurality of trunks, a number of trunks in the plurality of trunks, a corresponding trunk group and member number for each trunk in the plurality of trunks, a trunk group termination point for the plurality of trunks, and the first signaling address representing the computing platform for the associated signaling path.

20. The method according to claim 15, further comprising the steps of:

detecting, by the second base station element, that a handover of the communication signal is desired;

notifying the mobile switching element a handover of the communication signal to the first wireless communication system is desired via an outbound handover request message, the outbound handover request message comprising an identity of the second base station element and an identity of the landline switching element;

translating the identity of the landline switching element by the mobile switching element;

selecting the plurality of trunks between the landline switching element and the mobile switching element as a result of translating the identity of the landline switching element;

selecting one of the plurality of trunks for carrying user data traffic, the one of the plurality of trunks identified by a trunk group and member number; and selecting a signaling path between the mobile switching element and the computing platform for carrying signaling messages based on the mobile trunk group table, the selection of the signaling path based upon the first address as a table entry in the mobile trunk group table associated with the one of the plurality of trunks.

21. The method according to claim 20, wherein selecting the second signaling path comprises the steps of:

generating an IS-41 message, the IS-41 message comprising an identity of the first base station element, an identity of the landline switching element, and the identity of the one of the plurality of trunks; and forwarding the IS-41 message from the mobile switching element to the computing platform.

22. The method according to claim 21, wherein the IS-41 message comprises a IS-41 facilities request message.

23. The method according to claim 21, further comprising the steps of:

selecting a GDN by the computing platform, the selection of the GDN based on a translation of the IS-41 message by the message translation table;

selecting a CIC number by the computing platform, the selection of the CIC number based on a translation of the IS-41 message by the message translation table;

selecting an idle user data path between the first base station element and the landline switching element, the idle user data path between the first base station element and the landline switching element identified by a terminal directory number (TDN);

formulating an ISUP initial address message (IAM) by the computing platform, the ISUP IAM comprising the TDN, the GDN, and the CIC number; and forwarding the ISUP IAM message to the landline switching element.

24. The method according to claim 23, further comprising the steps of:

acknowledging receipt of the ISUP IAM message by the landline switching element to the computing platform;

forwarding a call setup message from the landline switching element to the computing platform;

forwarding an answer message from the computing platform to the landline switching element upon receipt of the call setup message by the computing platform; and forwarding an ISUP answer message from the landline switching element to the computing platform upon receipt of the answer message by the landline switching element, the ISUP answer message indicating an establishment of a new voice path between the mobile station and the first base station system via the second base station element, the mobile switching element and landline switching element.

25. The method according to claim 24, further comprising the steps of:

forwarding an inbound handover request message from the computing platform to the first base station element, the inbound handover request message comprising the identity of the first base station element, an identity of the second base station element, an identity of the mobile station, and the TDN; and forwarding an IS-41 circuit and voice channel connect message from the computing platform to the mobile switching element.

26. The method according to claim 25, further comprising the steps of:

forwarding a handover complete message from the first base station element to the computing platform upon acquisition on the communication signal by the first base station element;

forwarding an IS-41 mobile on channel message from the computing platform to the mobile switching platform; and directing a cross-connection by the mobile switching element in the second base station element, the cross-connection connecting the new voice path and resulting in a dropping of the communication signal between the second base station element and the mobile station.

27. The method according to claim 15, wherein the first wireless communication system comprises a Generic C architecture based wireless communication system.

28. The method according to claim 15, wherein the landline switching element comprises a class 5 switch.

29. The method according to claim 15, wherein the second wireless communication system comprises one of a code division multiple access (CDMA) system, a time division multiple access (TDMA) system and an analog communication system.

30. An apparatus for completing a handover of a communication signal associated with a mobile communication unit between a first wireless communication system and a second wireless communication system, the first wireless communication system comprising a landline switching element, a computing platform and a first base station element, and the second wireless communication system comprising a mobile switching element and a second base station element, the apparatus comprising:

a plurality of trunks between the landline switching element and the mobile switching element, the plurality of trunks, when selected, capable of carrying user data traffic;

a landline number routing table in the landline switching element, the landline number routing table automatically selecting the plurality of trunks upon receipt of a guide directory number (GDN);

a landline trunk group table in the landline switching element, the landline trunk group table having as input an identity of the plurality of trunks and providing as output an identity of one of the plurality of trunks and an associated signaling path to the computing platform;

a mobile trunk group table in the mobile switching element, the mobile trunk group table having as input an identity of the plurality of trunks and providing as output an identity of one of the plurality of trunks and an associated signaling path to the computing platform; and a message translation table in the computing platform, the message translation table capable of translating an ISUP signaling message into an IS-41 signaling message and capable of translating an IS-41 message into an ISUP signaling message.

* * * * *